United States Patent
Daup et al.

(10) Patent No.: US 9,239,338 B2
(45) Date of Patent: Jan. 19, 2016

(54) VANE DEVICE FOR A DYNAMIC FLOW ANGLE MEASUREMENT

(71) Applicant: Rosemount Aerospace Inc., Burnsville, MN (US)

(72) Inventors: Michael Robert Daup, Bloomington, MN (US); Brian Brent Naslund, Chanhassen, MN (US); Andrew Edmund Sherman, Farmington, MN (US); Richard Zhongmin Li, Plymouth, MN (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 70 days.

(21) Appl. No.: 14/184,248

(22) Filed: Feb. 19, 2014

(65) Prior Publication Data

US 2015/0233963 A1 Aug. 20, 2015

(51) Int. Cl.
*G01P 13/00* (2006.01)
*G01W 1/00* (2006.01)
*G01P 13/02* (2006.01)

(52) U.S. Cl.
CPC ..................................... *G01P 13/02* (2013.01)

(58) Field of Classification Search
None
See application file for complete search history.

(56) References Cited

U.S. PATENT DOCUMENTS

| 1,344,315 | A | | 6/1920 | Post |
| 2,447,224 | A | | 8/1948 | Akerman |
| 3,691,829 | A | * | 9/1972 | Perry ......................... 73/170.06 |
| 3,882,721 | A | * | 5/1975 | Neary et al. ................ 73/170.02 |
| 4,121,088 | A | | 10/1978 | Doremus et al. |
| 4,672,846 | A | * | 6/1987 | LeBlond ............... G01P 13/025 73/170.02 |
| 5,438,865 | A | * | 8/1995 | Greene ........................... 73/180 |
| 5,595,137 | A | * | 1/1997 | Delmonte ..................... 116/264 |

FOREIGN PATENT DOCUMENTS

| GB | 1395075 | 5/1975 |
| WO | 0144820 | 6/2001 |

OTHER PUBLICATIONS

Application No. 15154699.1-1558; European Search Report dated Jun. 24, 2015; 7 pages.

* cited by examiner

*Primary Examiner* — Peter Macchiarolo
*Assistant Examiner* — Jermaine Jenkins

(57) ABSTRACT

A vane for dynamic flow angle measurements may have improved performance for time lag responsiveness over a prior art delta-shaped vane. In various embodiments, a gust sensing vane may have a cropped-delta shape and configured to align to a fluid flow direction, where the gust sensing vane comprises a forward portion having a leading edge and an aft portion having a first trailing edge and a second trailing edge. A cross-sectional area of the forward portion may have a triangular shape. Furthermore, a cross-sectional area of the aft portion has two substantially parallel sides to form the cropped-delta shape of the gust sensing vane. The gust sensing vane may be coupled to, and extend away from, a rotary hub.

17 Claims, 7 Drawing Sheets

Side View (2D)

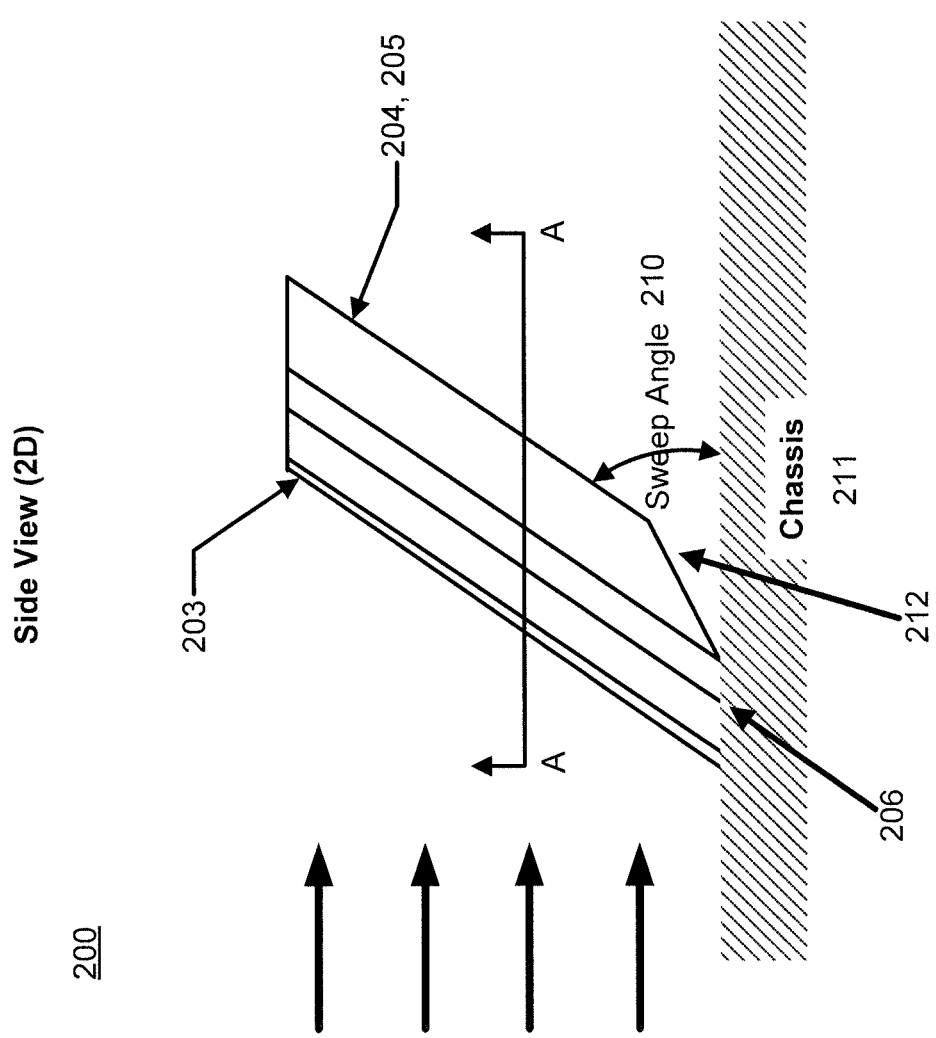

VANE DEVICE FOR A DYNAMIC FLOW ANGLE MEASUREMENT

FIELD

The present disclosure relates to a vane for gust sensing, and more particularly, to a gust sensing vane device for a flow angle measurement.

BACKGROUND

Conventional gust measuring devices may have low accuracy and high lag time associated with dynamic flow angle measurements at high angular accelerations. High lag time is of course relative, as most devices are capable of providing measurements within milliseconds. However, the responsiveness of the measuring device, even at a range of milliseconds, may be significant for various applications. FIG. 1 illustrates a typical flow measuring device with a traditional delta-shape cross-section.

SUMMARY

A gust sensing vane may have improved performance for time lag responsiveness and noise characteristics over a prior art delta-shaped vane. In various embodiments, a gust sensing vane may have a cropped-delta shape and be configured to align to a fluid flow direction, where the gust sensing vane comprises a forward portion having a leading edge and an aft portion having a first trailing edge and a second trailing edge. A cross-sectional area of the forward portion may have a triangular shape. Furthermore, a cross-sectional area of the aft portion has two substantially parallel sides to form the cropped-delta shape of the gust sensing vane. The gust sensing vane may be coupled to, and extend away from, a rotary hub. Furthermore, in various embodiments, the leading edge of the forward portion may be rounded. Additionally, in various embodiments, the first trailing edge and the second trailing edge of the aft portion may each be sharp trailing edges of approximately 90°.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 2B illustrates, in accordance with various embodiments, a perspective view of a gust sensing vane;

DETAILED DESCRIPTION

Figure 1:
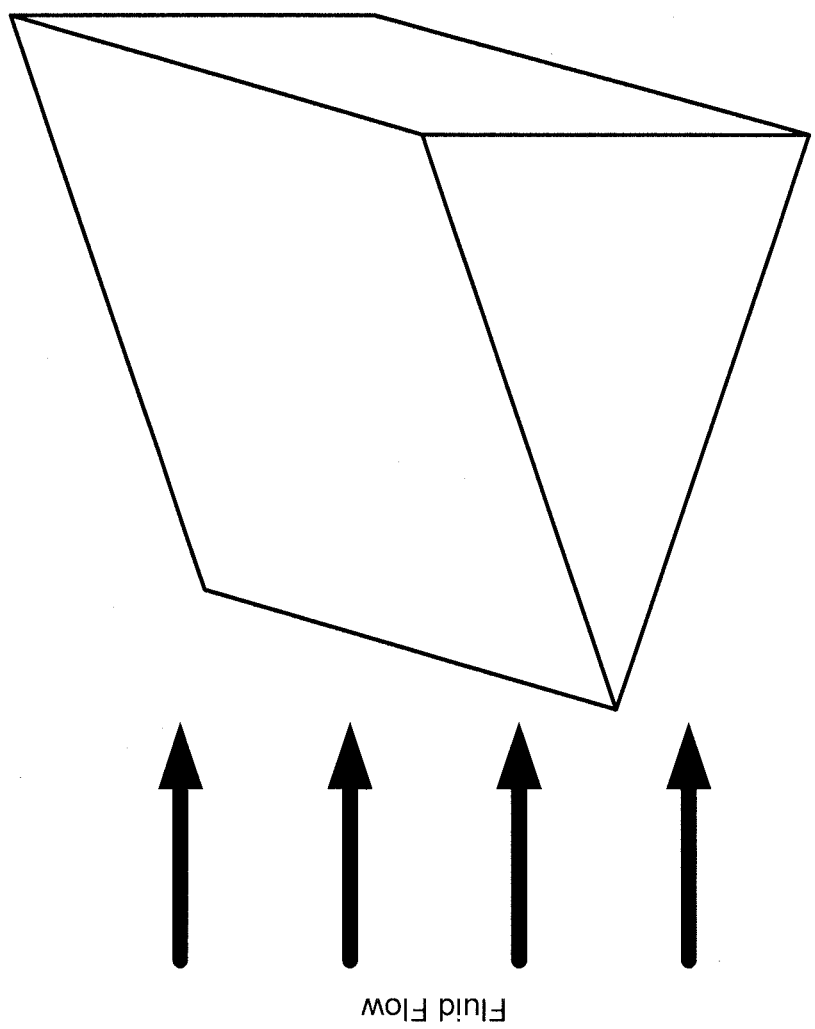
FIG. 1 illustrates a prior art delta-shaped gust measuring device.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, electrical, material, and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Gust sensing vanes provide unique aerodynamic shape for the sensing element of a flow measurement device which allows for increased responsiveness with a sufficiently short lag time from a sensor input to sensor output while maintaining a dither characteristic during dynamic angle measurements at high angular acceleration. Applicable to sensors installed on moving platforms such as aircraft, helicopters, hovercraft, and watercraft, as well as stationary platforms that involve continuous accurate measurement of fluid flow (e.g., wind tunnels and other testing devices).

A gust sensing vane aligns to a fluid flow direction and can be part of a fluid direction measurement system. The gust sensing vane may be designed to operate in either a gas environment or a liquid environment. In accordance with various embodiments and with reference to FIGS. 2A and 2B, a gust sensing vane 200 may have a cropped-delta shape. The gust sensing vane 200 may comprise a forward portion 201 having a leading edge 202, and an aft portion 203 having a first trailing edge 204 and a second trailing edge 205. A cross-sectional area of the forward portion 201 may have a triangular shape, and a cross-sectional area of the aft portion 203 may have two substantially parallel sides. In various embodiments, the gust sensing vane 200 may be coupled to, and extending away from, a rotary hub 206.

Furthermore, in various embodiments, the leading edge 202 of the gust sensing vane 200 may be rounded. A rounded leading edge 202 may be beneficial in environments where icing of the gust sensing vane is of concern. Moreover, in various embodiments, the first trailing edge 204 and the second trailing edge 205 of the aft portion 203 may be sharp trailing edges. As used herein, a sharp trailing edge is defined as an approximately 90° corner. In other various embodiments, the first trailing edge 204 and the second trailing edge 205 of the aft portion 203 may be curved or rounded trailing edges. The shape of the first and second trailing edges 204, 205 may have various aerodynamic effects on the gust sensing vane.

As mentioned above, the gust sensing vane may be coupled to a rotary hub. Further, in various embodiments and with continued reference to FIG. 2B, the gust sensing vane 200 may be coupled to the rotary hub 206 and extends at a rearward sweep angle 210 from the rotary hub 206. In other various embodiments, the gust sensing vane may extend from the rotary hub at various sweep angles to the rotary hub. In yet other various embodiments, the gust sensing vane may extend perpendicular to the rotary hub and be offset from the axis of rotation of the rotary hub. Furthermore, in various embodiments and with continued reference to FIG. 2B, the gust sensing vane 200 may further comprise an aft notch angle 212 between the gust sensing vane 200 and the rotary hub 206.

The rotary hub may be coupled to an airplane chassis 211. The gust sensing vane may be part of a wind measurement device. The wind measurement device may determine the airflow direction, and measure gusts in the airflow. In order to adjust for vertical wind gusts, a gust sensing vane may be positioned substantially parallel to a plane perpendicular to the vertical fluid flow. In some applications, the airflow direction and gust information can be used to improve the performance of an aircraft as well as reduce its turbulence levels. In these applications, the wind measurement device may be mounted on the aircraft nose in order to detect a wind gust as early as possible. After detection by the wind measurement device, the gust data may be transmitted to the aircraft flight control system. The flight control system may be able to move the aircraft control surfaces using advanced algorithms based on the gust data in order to compensate for the gust. Measurement accuracy is an important factor for this system because the control surface movement magnitude is dependent on the measured gust profile. Similarly, data latency is an important factor as well since the system must detect, compute, and compensate for a gust by the time the gust reaches the wings. In a typical application, this series of events may occur in less than 0.1 seconds.

In aircraft environments, a gust sensing vane may be subject to icing, which decreases the accuracy and responsiveness of the device. In order to prevent icing, in various embodiments, the gust sensing vane may further comprise a heating element located within the aft portion and extending along at least a portion of a length of the gust sensing vane. The gust sensing vane may include the heating element in metal embodiments of the vane. For example, the gust sensing vane may be made of at least one of copper, aluminum, or other suitable metals. In accordance with various embodiments, the gust sensing vane has improved de-icing performance due to reduced cross-sectional area exposed to moisture impingement during icing conditions as compared to a prior art delta-shaped sensing vane. Also, the reduced cross-sectional areas of the sensing vane may result in portions of the perimeter being closer to a heating element, and therefore more efficient de-icing performance.

The gust sensing vane may further comprise a surface treatment, such as an anodized surface treatment of an aluminum gust sensing vane. The surface treatment may improve one or more of vane strength, de-icing characteristics, corrosion resistance, and wear resistance. Moreover, in various embodiments, the gust sensing vane may be made of plastic, wood, composite materials, or other suitable materials.

Figure 2A:
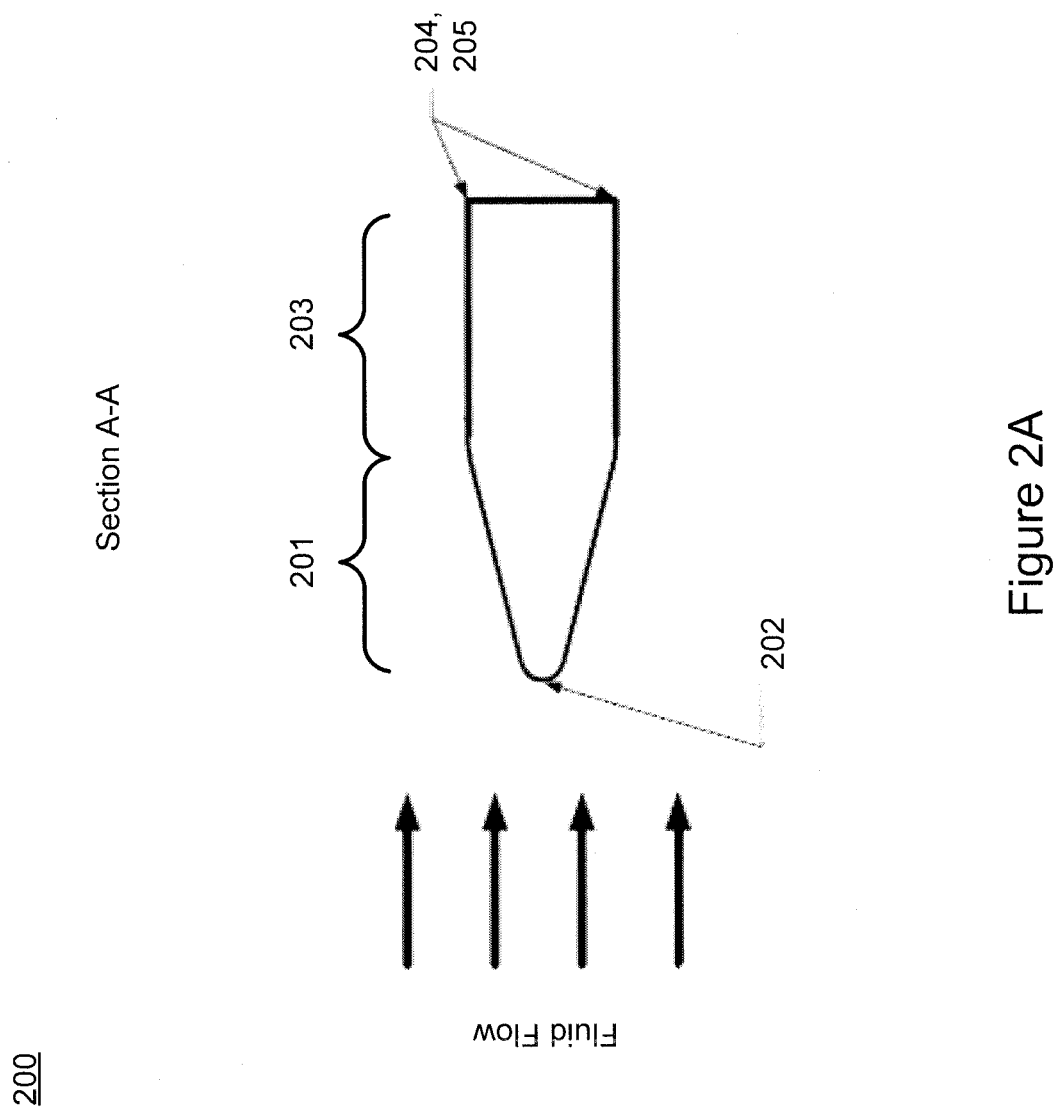
FIG. 2A illustrates, in accordance with various embodiments, a sectional view of a gust sensing vane.

An exemplary gust sensing vane may have a forward portion and an aft portion as illustrated in FIG. 2A. The proportions of the forward and aft portions may be designed for specific aerodynamic responses and for different applications. In various embodiments, the proportions of the forward portion and aft portion lengths may be between 35% and 65% relative to each other. For example, in one embodiment, the forward portion and the aft portion may each be 50% of the overall gust sensing vane cross-sectional length. In another embodiment, the forward portion may be 65% of the overall gust sensing vane cross-sectional length and the aft portion may be 35%. In yet another embodiment, the forward portion may be 35% of the overall gust sensing vane cross-sectional length and the aft portion may be 65%. Furthermore, all various ranges between 35% and 65% are contemplated herein. As described in another manner, in various embodiments, the ratio of the forward portion to the aft portion is 1:1 within 15% variance. The value of the variance may be dependent on one or more of an expected fluid flow velocity, viscosity, density, the expected fluid environment, and the desired system performance.

Furthermore, another aspect of the gust sensing vane is the angle of the leading edge of the forward portion. In various embodiments, the angle of the leading edge of the forward portion is symmetrical about a bisecting axis of the gust sensing vane, and the angle is between about 10° to about 30°. Moreover, in various embodiments, the angle of the leading edge of the aft portion is symmetrical about a bisecting axis of the gust sensing vane, and the angle of the leading edge is approximately 20°. The gust sensing vane of 1, further comprising a curved transition between the forward portion and the aft portion.

Figure 3:
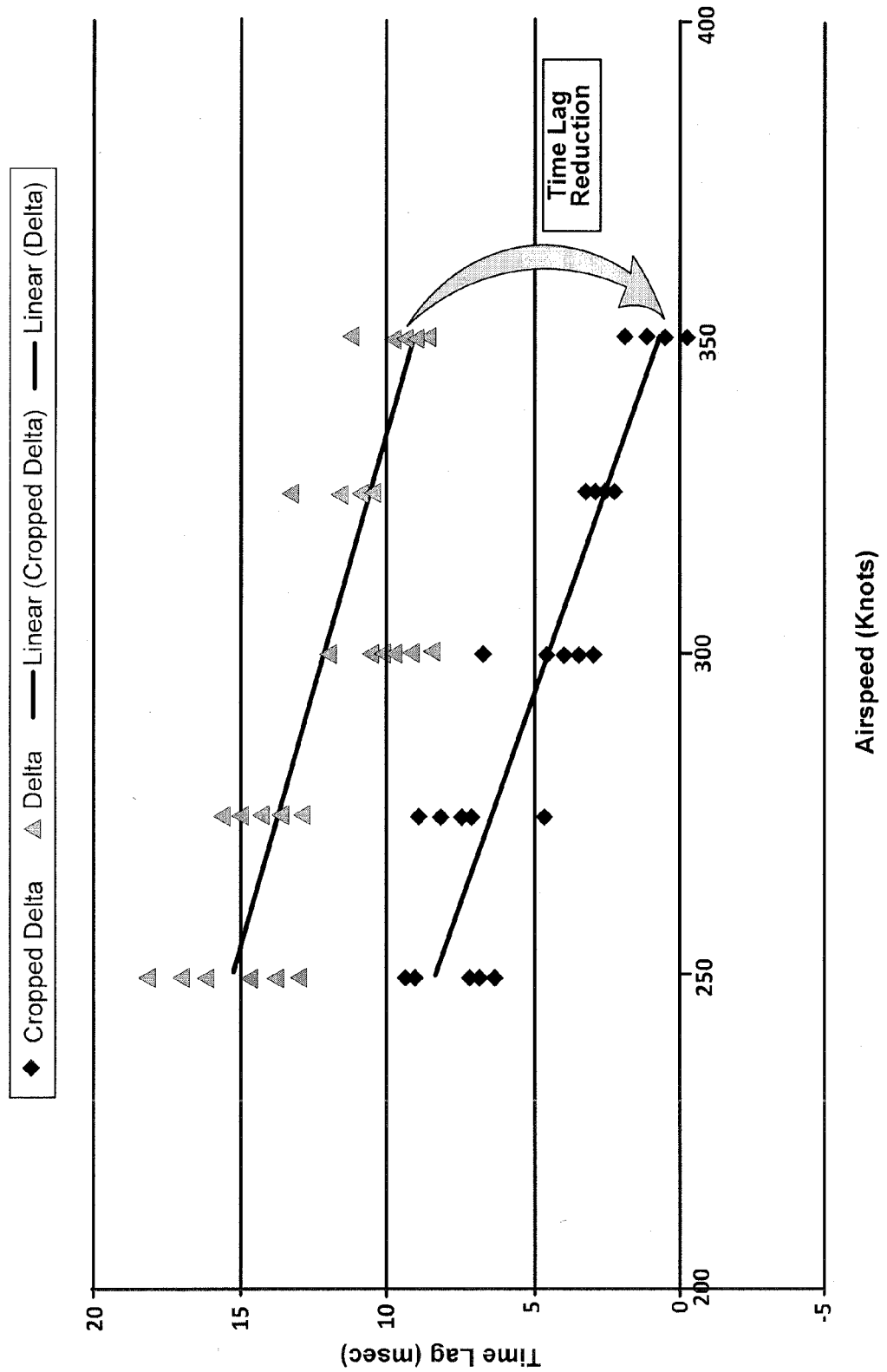
FIG. 3 is a graphical illustration of sensing lag time of an exemplary gust sensing vane compared to a prior art delta-shaped vane across various fluid speeds.
Figure 4A:
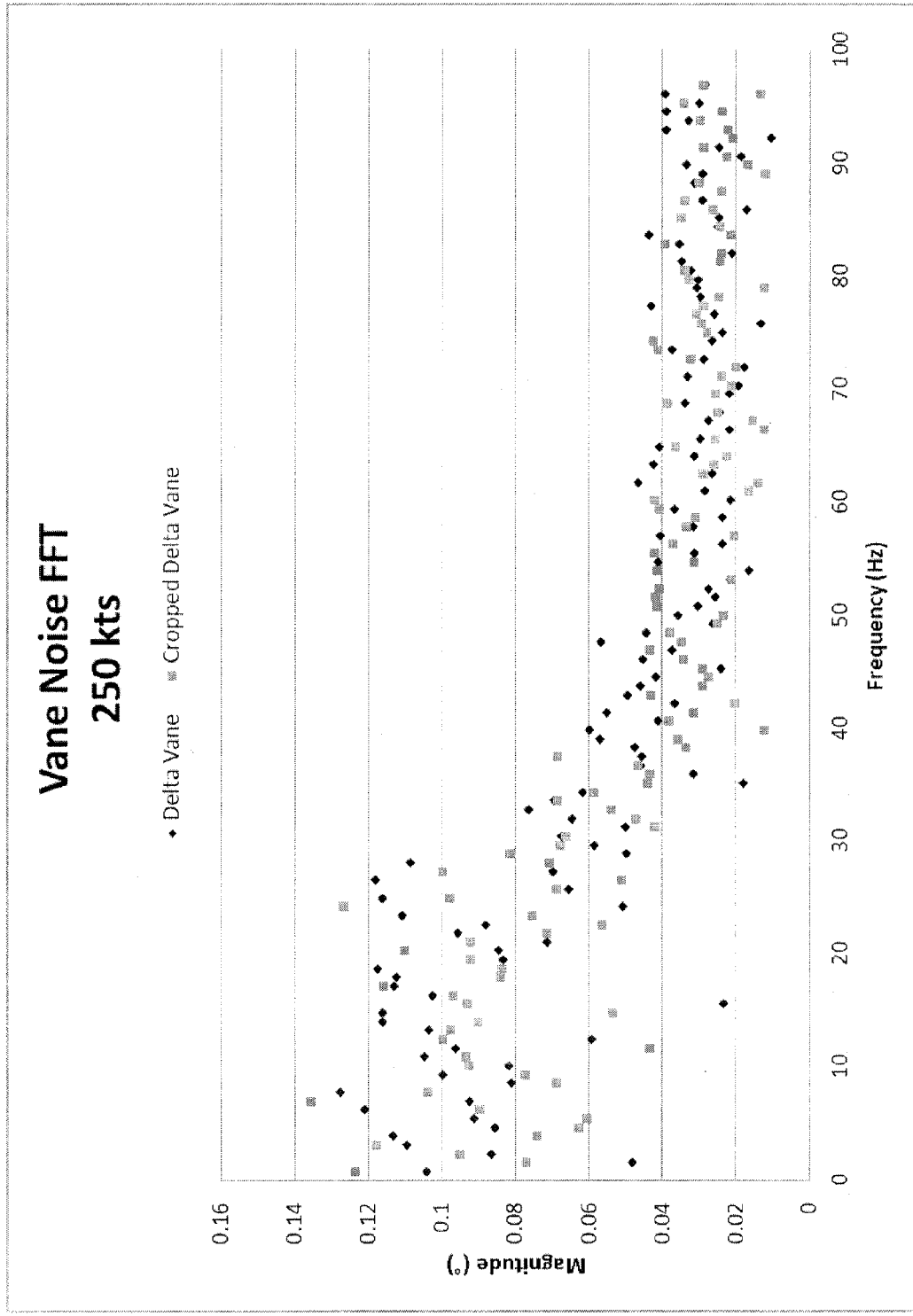
FIG. 4A is a graphical illustration of vane noise characteristics of an exemplary gust sensing vane compared to a prior art delta-shaped vane at 250 knots.
Figure 4B:
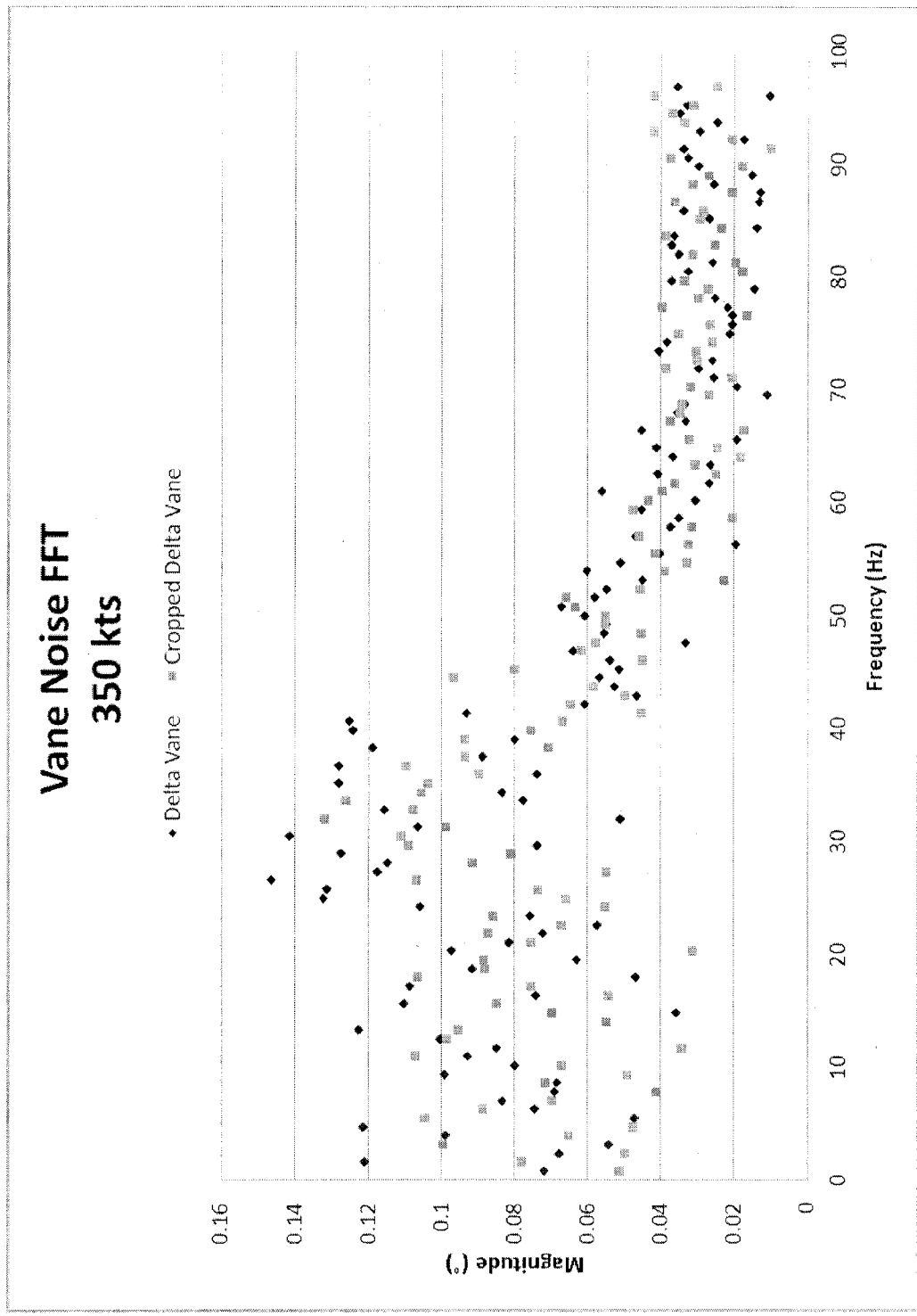
FIG. 4B is a graphical illustration of vane noise characteristics of an exemplary gust sensing vane compared to a prior art delta-shaped vane at 350 knots.

As previously mentioned, responsiveness of a gust sensing vane is an important performance factor. Testing of the various embodiments disclosed herein has shown high responsiveness and a significant reduction in time lag between sensor input to sensor output in comparison to currently implemented designs. FIG. 3 is a graphical illustration of the measured time lag testing results, which compares the gust sensing vane performance against prior art delta-shaped device performance. In an exemplary result, at 250 knots of wind speed, the gust sensing vane may align to the fluid flow direction with a time lag less than 10 milliseconds. Compared to a delta-shaped design, the time lag was reduced by 6.933 milliseconds at 250 knots for a 45.7% reduction. Similarly, in an exemplary result, at 350 knots of wind speed, the gust sensing vane may align to the fluid flow direction with a time lag less than 5 milliseconds. Compared to a delta-shaped design, the time lag was reduced by 8.353 milliseconds at 350 knots for a 92.6% reduction. In addition, FIGS. 4A and 4B are graphical illustrations of the measure noise characteristics testing results. As shown, FIG. 4A illustrates measured noise at 250 knots and FIG. 4B illustrates measured noise at 350 knots. The testing shows that the noise characteristics were substantially unchanged between the gust sensing vane performance and the prior art delta-shaped device performance.

Figure 5:
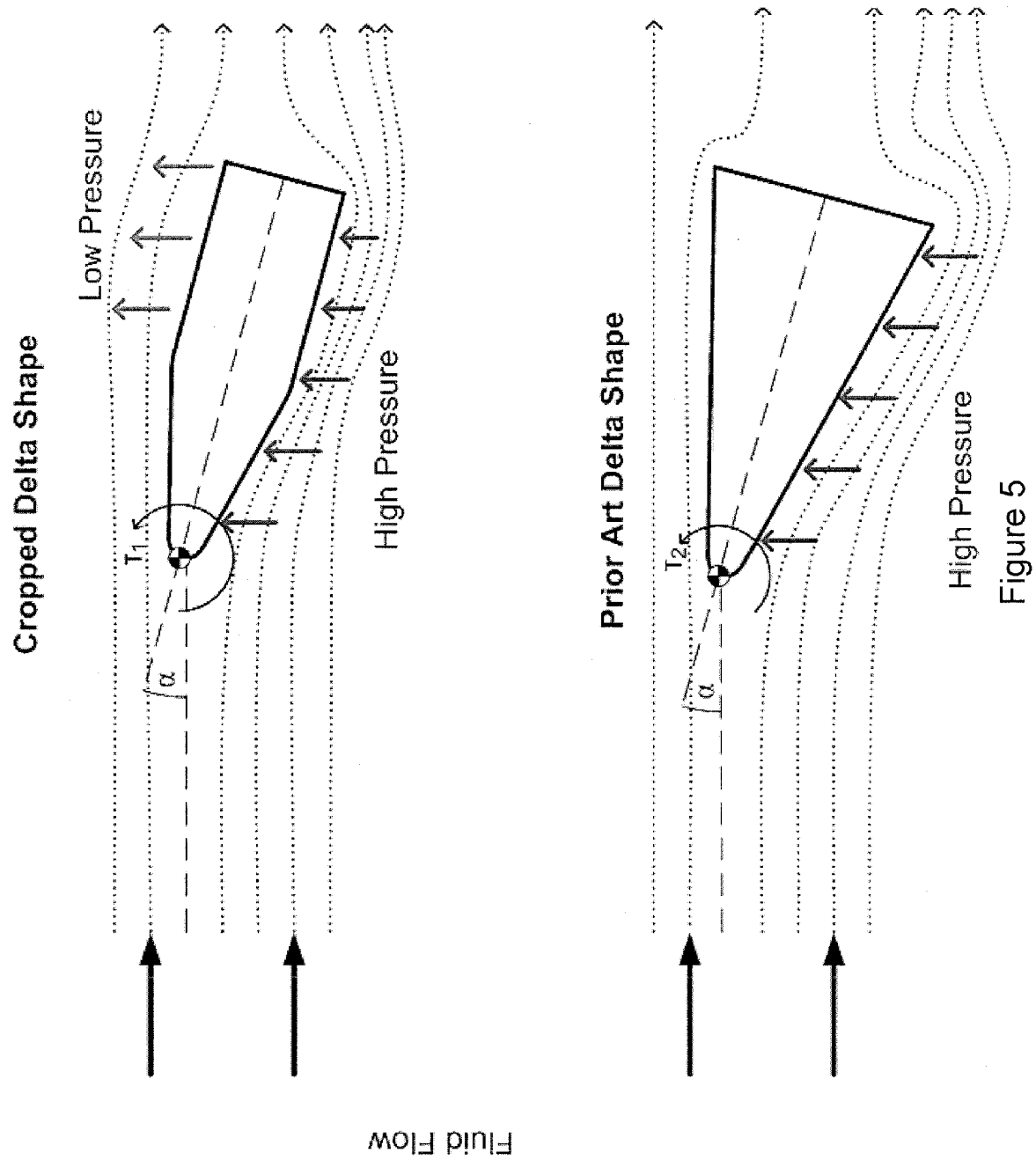
FIG. 5 illustrates, in accordance with various embodiments, alignment torque of an exemplary gust sensing vane in comparison to alignment torque of a prior art delta-shaped vane.

Another way to describe the increased performance of the gust sensing vane may be the increased torque generation of the vane for the same applied force compared to a prior art sensing vane. The increased torque generation may result in quicker responses to fluid flow changes and provide improved static accuracy of the vane. The exemplary gust sensing vane may provide increased torque generation due to less mass of the vane and may provide improvement due to an angle of incident factor of the fluid flow change. Furthermore, as illustrated in FIG. 5, an exemplary gust sensing vane, if misaligned from the local fluid flow, may create a low pressure zone on the leeward side of the vane, which increases the aligning torque when compared to a prior art shape. Thus the aligning torque $T_1$ of a cropped delta-shaped vane may be greater than the aligned torque $T_2$ of a prior art delta-shaped vane.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A gust sensing vane having a cropped-delta shape and for being coupled to a rotary hub, wherein the gust sensing vane comprises:
   a forward portion tapering to a straight leading edge that has a length along an axis perpendicular to the rotary hub, wherein a cross-sectional area of the forward portion has a triangular shape; and
   an aft portion having a first trailing edge and a second trailing edge, wherein a cross-sectional area of the aft portion has two substantially parallel sides;
   wherein the gust sensing vane is configured to be coupled to, and extend away from, the rotary hub;
   wherein the leading edge of the forward portion is swept rearward and is symmetrical about a bisecting axis that extends away from the rotary hub; and
   wherein the gust sensing vane aligns to a fluid flow direction.

2. The gust sensing vane of claim 1, wherein the leading edge is rounded.

3. The gust sensing vane of claim 1, wherein the first trailing edge and the second trailing edge are each sharp trailing edges of approximately ninety degrees (90°).

4. The gust sensing vane of claim 1, wherein the gust sensing vane is part of a wind measurement device, and wherein the rotary hub is coupled to an airplane chassis.

5. The gust sensing vane of claim 4, wherein the leading edge is positioned substantially parallel to a plane perpendicular to the fluid flow direction.

6. The gust sensing vane of claim 1, further comprising an aft notch angle between the gust sensing vane and the rotary hub.

7. The gust sensing vane of claim 1, further comprising a heating element located within the aft portion and extending along at least a portion of a length of the gust sensing vane.

8. The gust sensing vane of claim 1, wherein the gust sensing vane comprises at least one of copper or aluminum.

9. The gust sensing vane of claim 8, further comprising a surface treatment for at least one of improved vane strength, improved de-icing characteristics, corrosion resistance, and wear resistance.

10. The gust sensing vane of claim 1, wherein the gust sensing vane comprises at least one of plastic, wood, or a composite material.

11. The gust sensing vane of claim 1, wherein each of the forward portion and the aft portion of the gust sensing vane is at least 35% of the cross-sectional length.

12. The gust sensing vane of claim 1, wherein a ratio of the forward portion to the aft portion is 1:1 within 15% variance, and wherein the value of the variance is dependent on an expected fluid flow velocity.

13. The gust sensing vane of claim 1, wherein the gust sensing vane aligns to the fluid flow direction with a time lag less than 10 milliseconds at 250 knots of wind speed.

14. The gust sensing vane of claim 1, wherein the gust sensing vane aligns to the fluid flow direction with a time lag less than 5 milliseconds at 350 knots of wind speed.

15. The gust sensing vane of claim 1, wherein the angle of the leading edge is between 10° to 30°.

16. The gust sensing vane of claim 1, wherein the angle of the leading edge is approximately 20°.

17. The gust sensing vane of claim 1, further comprising a curved transition between the forward portion and the aft portion.

* * * * *